(12) United States Patent
Adachi et al.

(10) Patent No.: US 7,596,178 B2
(45) Date of Patent: Sep. 29, 2009

(54) VIDEO ENCODING METHOD, VIDEO DECODING METHOD, VIDEO ENCODING APPARATUS, VIDEO DECODING APPARATUS, VIDEO ENCODING PROGRAM, AND VIDEO DECODING PROGRAM

(75) Inventors: Satoru Adachi, Yokohama (JP); Choong Seng Boon, Yokohama (JP); Sadaatsu Kato, Yokosuka (JP); Minoru Etoh, Yokohama (JP); Thiow Keng Tan, Jalan Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 714 days.

(21) Appl. No.: 10/671,527

(22) Filed: Sep. 29, 2003

(65) Prior Publication Data

US 2004/0066847 A1    Apr. 8, 2004

(30) Foreign Application Priority Data

Oct. 3, 2002   (JP)   ............................. 2002-291610
Jul. 2, 2003   (JP)   ............................. 2003-190634

(51) Int. Cl.
*H04B 1/66* (2006.01)
(52) U.S. Cl. ........................... 375/240.15; 375/240.25; 375/240.28; 375/240.26; 375/240.24; 375/240.02; 382/233; 382/235; 382/239
(58) Field of Classification Search ............ 375/240.15, 375/240.26, 240.28, 240.24, 240.02; 382/233, 382/235, 239
See application file for complete search history.

(56) References Cited

U.S. PATENT DOCUMENTS

| 5,838,383 | A | * | 11/1998 | Chimoto et al. | ............. 348/553 |
| 5,952,943 | A | * | 9/1999 | Walsh et al. | ................... 341/50 |
| 6,188,700 | B1 | * | 2/2001 | Kato et al. | ................... 370/477 |
| 6,205,177 | B1 | * | 3/2001 | Girod et al. | ............ 375/240.14 |
| 6,934,335 | B2 | * | 8/2005 | Liu et al. | ............... 375/240.16 |

FOREIGN PATENT DOCUMENTS

JP    2002-218461    8/2002
KR    10-0269548    10/2000

OTHER PUBLICATIONS

Wiegand, Draft ITU-T Recommendations . . . , Video Specification, Mar. 2003, JVT & ISO/IEC, pp. 204-238.*

(Continued)

*Primary Examiner*—Shawn An
(74) *Attorney, Agent, or Firm*—Brinks Hofer Gilson & Lione

(57) ABSTRACT

A video processing system is provided with video encoding apparatus 1 and video decoding apparatus 2. The encoding apparatus 1 outputs a maximum delay time that is incurred by backward prediction, in addition to encoded data D1 resulting from encoding of video data D0. The decoding apparatus 2 effects input of the maximum delay time that is incurred by backward prediction, in addition to encoded data D1 from the encoding apparatus 1. Then the decoding apparatus 2 decodes the encoded data D1 with reference to the input maximum delay time to generate motion video data D2.

10 Claims, 11 Drawing Sheets

OTHER PUBLICATIONS

Wiegand, Draft ITU-T Recommendations . . . , Video Specification, Mar. 2003, JVT & ISO/IEC, pp. 204-238.*

Patent Abstracts of Japan, JP 10-248066, Sep. 14, 1998.

T. Wiegand, "N4920 Text of Final Committee Draft of Joint Video Specification (ITU-T Rec. H.264 ISO/IEC 14496-10AVC)- Annex C "Hypothetical Reference Decoder"", ISO IEC JTC1 SC29 WG11 Coding of Moving Pictures and Audio, XP-002321520, Jul. 2002, pp. 157-161.

"Hypothetical Reference Decoder", ITU-T Rec. H. 264 ISO/IEC 14496-10 AVC, Jul. 22-26, 2002, 27 pages.

Fumitaka Ono, et al., "Basic Technologies on International Image Coding Standards", Corona Publishing Co., Ltd., Mar. 20, 1998, pp. 236-267 (with English Translation).

(No English Translation) Korean Office Action dated Sep. 28, 2005.

Office Action issued Sep. 29, 2003 in Japanese Patent Application No. 2003-190634 (with translation).

T. Wiegand, "Draft ITU-T Recommendation and Final Draft International Standard of Joint Video Specification (ITU-T Rec. H.264 | ISO/IEC 14496-10 AVC". Joint Video Team (JVT) of ISO/IEC MPEG & ITU-T VCEG (ISO/IEC JTC1/SC29/WG11 and ITU-T SG16 Q.6) 7$^{th}$ Meeting: Pattaya, Thailand, Mar. 7-14, 2003, pp. 205-238.

* cited by examiner

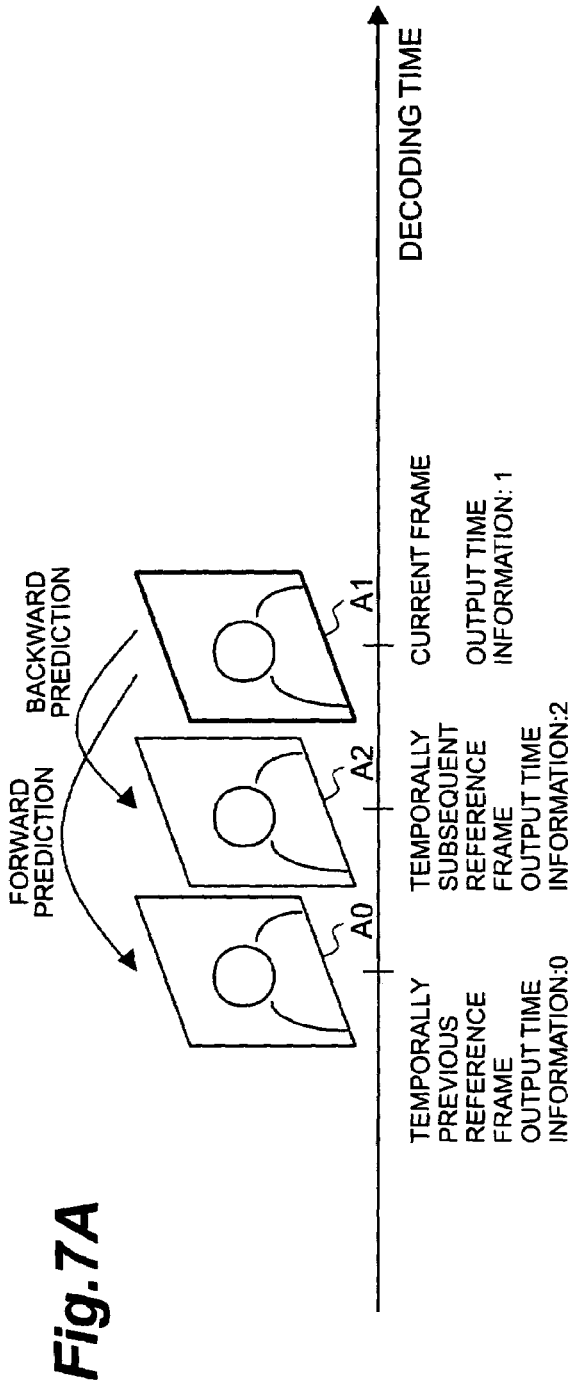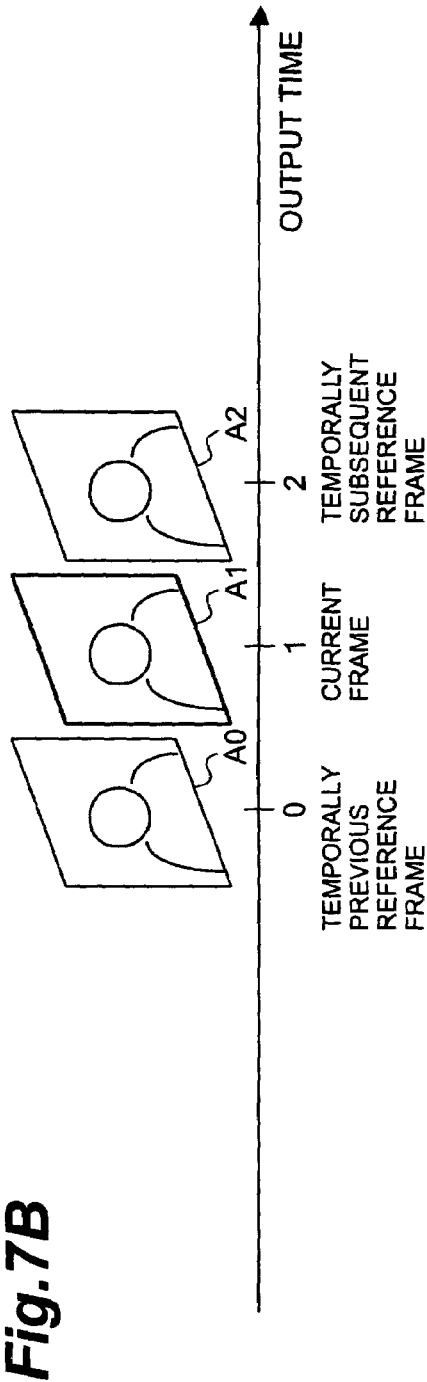

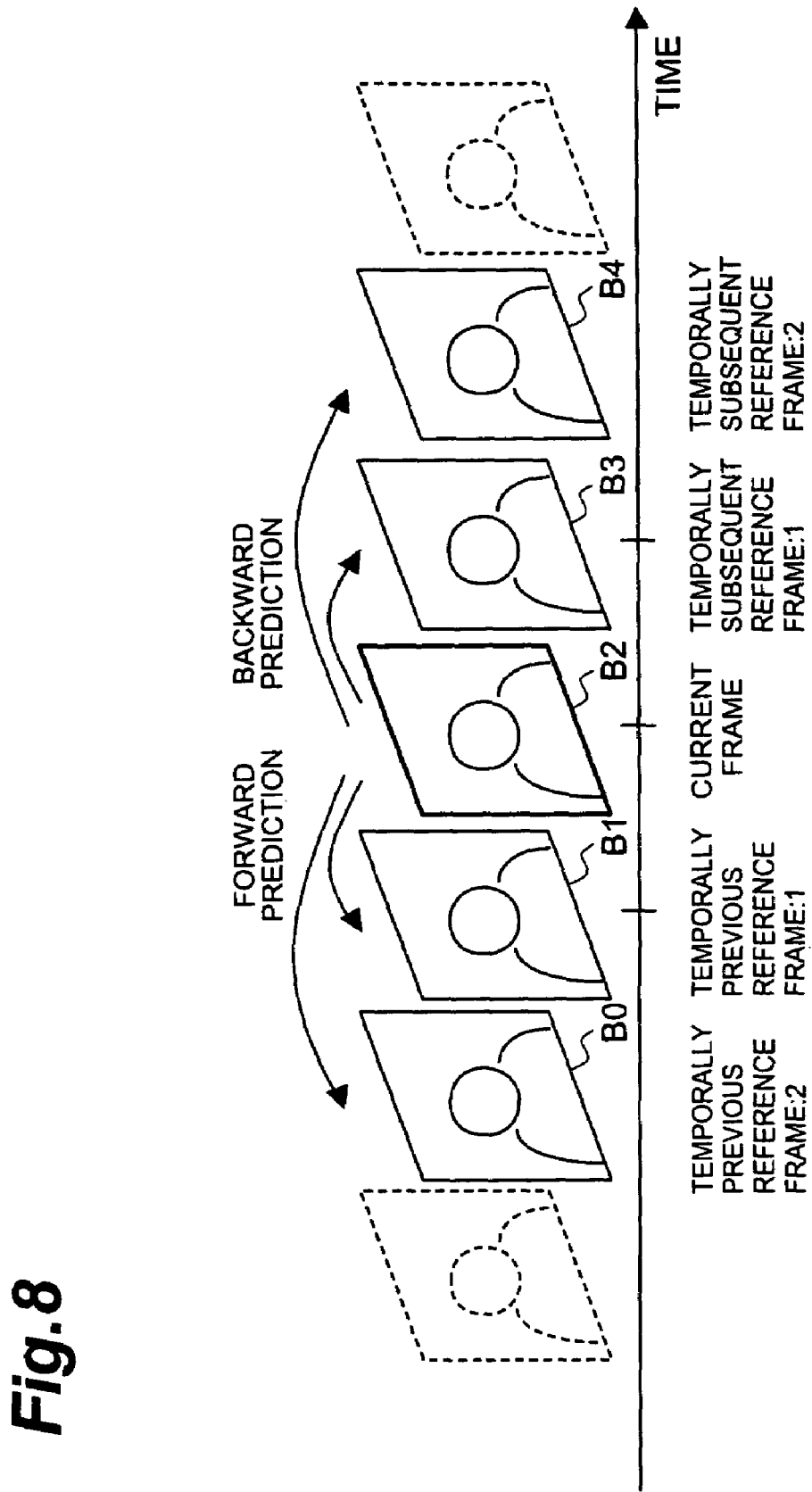

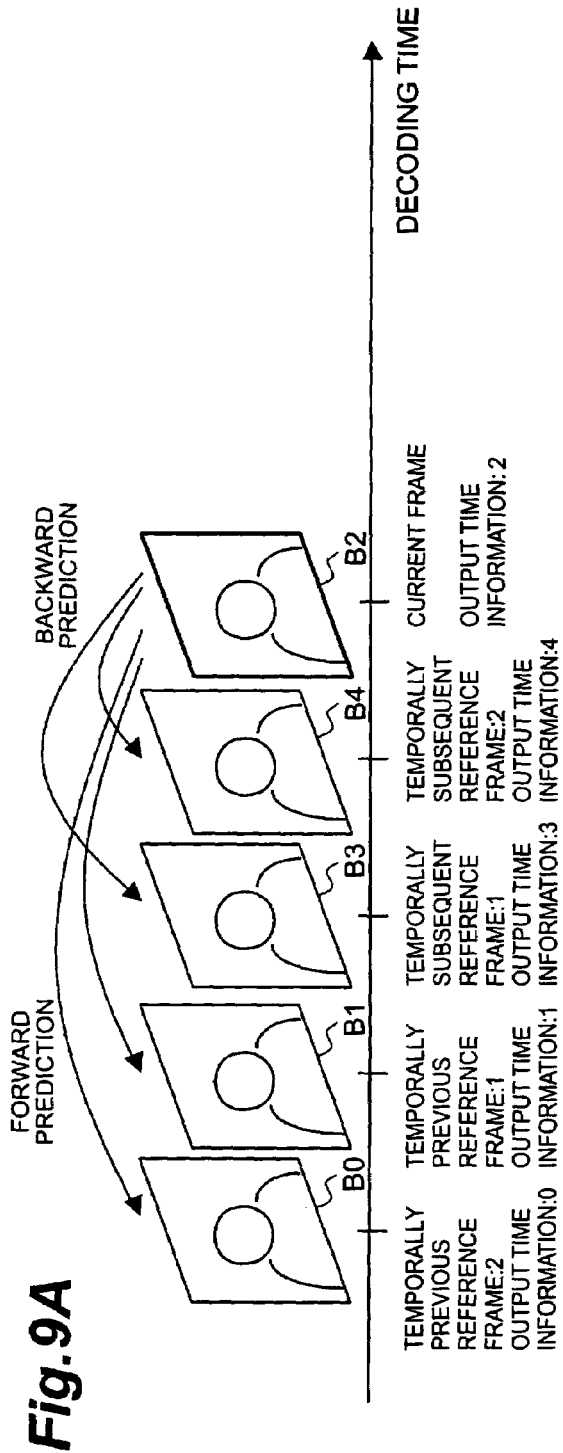
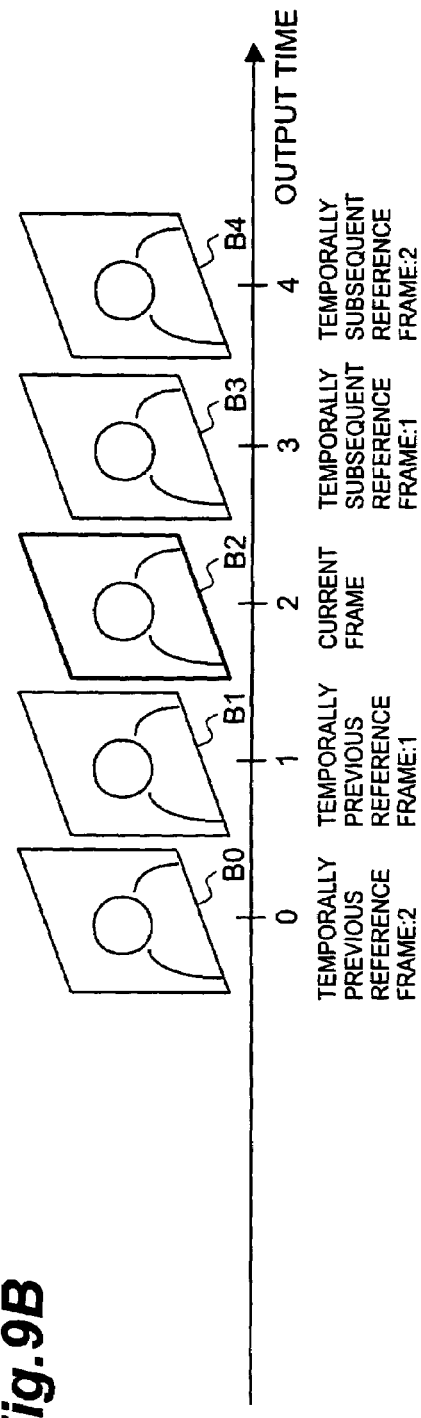
Fig.9A
Fig.9B

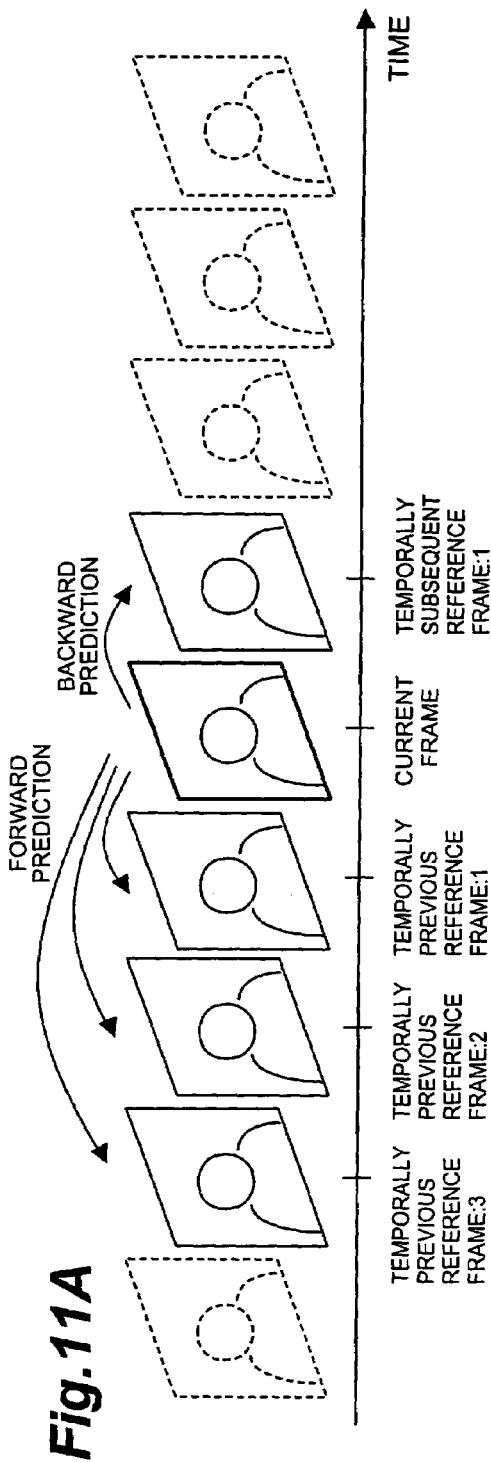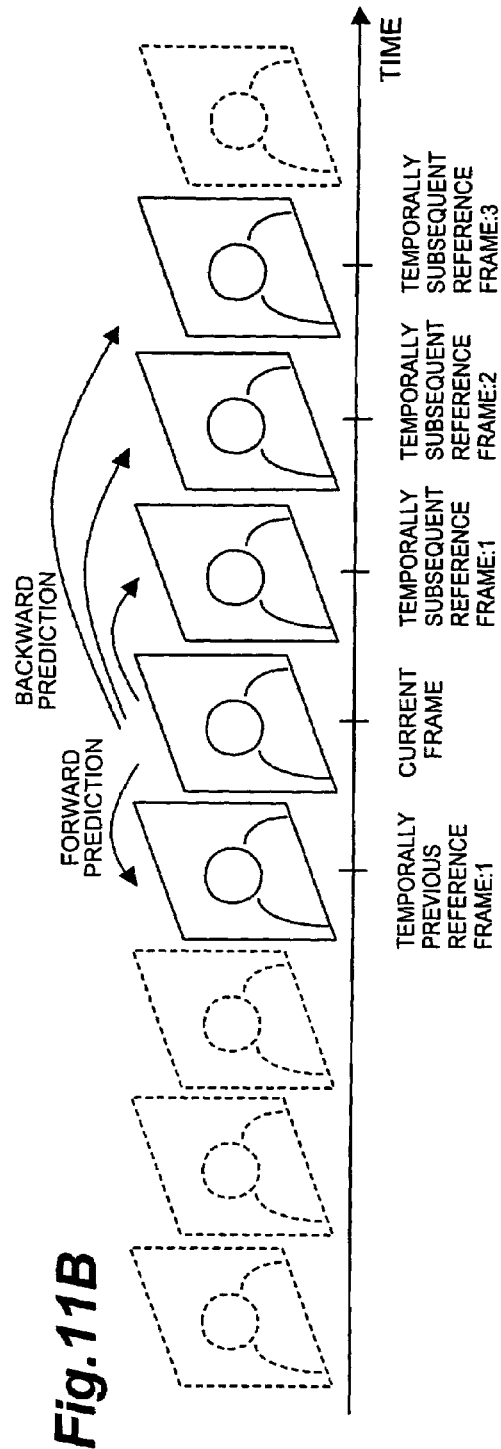

VIDEO ENCODING METHOD, VIDEO DECODING METHOD, VIDEO ENCODING APPARATUS, VIDEO DECODING APPARATUS, VIDEO ENCODING PROGRAM, AND VIDEO DECODING PROGRAM

BACKGROUND OF THE INVENTION

1. Field of the Invention

The present invention relates to a video encoding method, a video decoding method, a video encoding apparatus, a video decoding apparatus, a video processing system, a video encoding program, and a video decoding program.

2. Related Background Art

Video signal encoding techniques are used for transmission and storage-regeneration of video signals. The well-known techniques include, for example, the international standard video coding methods such as ITU-T Recommendation H.263 (hereinafter referred to as H.263), ISO/IEC International Standard 14496-2 (MPEG-4 Visual, hereinafter referred to as MPEG-4), and so on. Another known newer encoding method is a video coding method scheduled for joint international standardization by ITU-T and ISO/IEC; ITU-T Recommendation H.264 and ISO/IEC International Standard 14496-10 (Joint Final Committee Draft of Joint Video Specification, hereinafter referred to as H.26L).

Since a motion video signal consists of a series of images (frames) varying little by little with time, it is common practice in these video coding methods to implement interframe prediction between a frame retrieved as a target for encoding (current frame) and another frame (reference frame) and thereby reduce temporal redundancy in the video signal. In this case, where the interframe prediction is carried out between the current frame and a reference frame less different from the current frame, the redundancy can be reduced more and encoding efficiency can be increased.

For this reason, as shown in FIG. 6, the reference frame for the current frame A1 can be either a temporally previous frame A0 or a temporally subsequent frame A2 with respect to the current frame A1. The prediction with the previous frame is referred to as forward prediction, while the prediction with the subsequent frame as backward prediction. Bidirectional prediction is defined as a prediction in which one is arbitrarily selected out of the two prediction methods, or as a prediction in which both methods are used simultaneously.

In general, with use of such bidirectional prediction, as in the example shown in FIG. 6, a temporally previous frame as a reference frame for forward prediction and a temporally subsequent frame as a reference frame for backward prediction each are preliminarily stored prior to the current frame.

FIGS. 7A and 7B are diagrams showing (A) decoding and (B) output of the frames in the case of the bidirectional prediction shown in FIG. 6. For example, in the decoding of MPEG-4, where the current frame A1 is decoded by bidirectional interframe prediction, frame A0 being one temporally previous frame and frame A2 being one temporally subsequent frame with respect to the current frame A1 are first decoded as frames decoded by intraframe prediction without use of interframe prediction or as frames decoded by forward interframe prediction, prior to decoding of the current frame A1, and they are retained as reference frames. Thereafter, the current frame A1 is decoded by bidirectional prediction using these two frames A0, A2 thus retained (FIG. 7A).

In this case, therefore, the order of decoding times of the temporally subsequent reference frame A2 and the current frame A1 is reverse to the order of output times of their respective decoded images. Each of these frames A0, A1, and A2 is attached with output time information 0, 1, or 2, and thus the temporal sequence of the frames can be known according to this information. For this reason, the decoded images are outputted in the right order (FIG. 7B). In MPEG-4, the output time information is described as absolute values.

Some of the recent video coding methods permit the foregoing interframe prediction to be carried out using multiple reference frames, instead of one reference frame in the forward direction and one reference frame in the backward direction, so as to enable prediction from a frame with a smaller change from the current frame, as shown in FIG. 8. FIG. 8 shows an example using two temporally previous frames B0, B1 and two temporally subsequent frames B3, B4 with respect to the current frame B2, as reference frames for the current frame B2.

FIGS. 9A and 9B are diagrams showing (A) decoding and (B) output of the frames in the case of the bidirectional prediction shown in FIG. 8. For example, in the decoding of H.26L, a plurality of reference frames can be retained within a range up to a predetermined upper bound of the number of reference frames and, on the occasion of carrying out interframe prediction, an optimal reference frame is arbitrarily designated out of them. In this case, where the current frame B2 is decoded as a bidirectionally predicted frame, the reference frames are first decoded prior to the decoding of the current frame B2; the reference frames include a plurality of temporally previous frames (e.g., two frames B0, B1) and a plurality of temporally subsequent frames (e.g., two frames B3, B4) with respect to the current frame B2, which are decoded and retained as reference frames. The current frame B2 can be predicted from a frame arbitrarily designated as the one used for prediction out of those frames B0, B1, B3, and B4 (FIG. 9A).

In this case, therefore, the order of decoding times of the temporally subsequent reference frames B3, B4 and the current frame B2 becomes reverse to the order of their respective output times. Each of these frames B0-B4 is attached with output time information or output order information 0-4, and the temporal sequence of the frames can be known according to this information. For this reason, the decoded images are outputted in the right order (FIG. 9B). The output time information is often described as absolute values. The output order is used where frame intervals are constant.

For carrying out the decoding by the backward prediction using temporally subsequent frames as predictive frames, it is necessary to satisfy the condition that the decoding of the temporally subsequent frames is completed prior to the decoding of the current frame so as to be available as predictive frames. In this case, a delay is incurred before the decoded image of the current frame becomes available, as compared with a frame to which the backward prediction is not applied.

This will be specifically described below with reference to FIGS. 10A to 10C. FIGS. 10A to 10C correspond to the example shown in FIGS. 6, 7A, and 7B. First, encoded data of each frame A0-A2 is decoded in an order necessary for execution of interframe prediction, and it is assumed that intervals of the frames are constant time intervals according to a frame rate and that the time necessary for the decoding operation is negligible for each frame A0-A2, regardless of whether the interframe prediction is applied and regardless of the directions of interframe prediction (FIG. 10A). In practice, the decoding intervals of the frames A0-A2 do not have to be constant and can change depending upon such factors as variation in encoding bits of the frames A0-A2 or the like; however, they can be assumed to be constant on average. The time necessary for the decoding operation is not zero, either, but it will raise no significant problem in the description hereinafter if the difference thereof is not so large among the frames A0-A2.

It is supposed herein that a time when a decoded image of frame A0 without delay due to backward prediction and without reversal of the orders of decoding times and output times with respect to any other frame (a frame without delay and without reversal will be referred to hereinafter as a backward-prediction-nonassociated frame) is obtained, is defined as an output time correlated with the decoded image, and the decoded image is outputted at the output time. Supposing the subsequent frame is the backward predicted frame A1, the decoded image thereof will be decoded after the temporally subsequent frame A2, and a delay is thus made before the decoded image is obtained.

For this reason, if the time when the decoded image is obtained for the backward-prediction-nonassociated frame A0 is defined as a reference of output time, the decoded image of the backward predicted frame A1 is not obtained by the output time correlated therewith (FIG. 10B). Namely, an output time interval between the decoded image of the backward-prediction-nonassociated frame A0 and the decoded image of the backward predicted frame A1 becomes longer by the delay time necessary for execution of backward prediction than the original interval, which leads to unnatural video output.

Therefore, in the case where the backward interframe prediction is applied in video coding, as shown in FIG. 10C, it is necessary to preliminarily delay the output time of the decoded image of the backward-prediction-nonassociated frame A0 by the delay time necessary for execution of the backward prediction as well so as to be able to correctly handle the output time interval to the backward predicted frame A1.

Conventionally, the backward interframe prediction was applied to video encoding under the conditions that encoding was carried out at a high bit rate and the fixed frame rate of 30 frames/second equal to that of TV broadcast signals was always used, like TV broadcasting or accumulation thereof, because backward interframe prediction brings about more options for prediction and hence increase of computational complexity so as to make implementation thereof difficult on simple equipment and because the increase of delay time was not desired in real-time communication involving bidirectional interlocution like video conferences.

In this case, for example, as in MPEG-4, where the use of one temporally subsequent frame as a reference frame for backward prediction, the delay time necessitated in execution of the backward prediction is constant. For example, where the frame rate is 30 frames/second as described above, the delay time is a time interval of each frame, i.e., 1/30 second. Accordingly, the time by which the output time of the decoded image of the backward-prediction-nonassociated frame should be delayed, can be equally set to 1/30 second.

SUMMARY OF THE INVENTION

In recent years, however, following the improvement in computer performance and progress in diversification of video services, delay is tolerable in video delivery through the Internet and mobile communications, and there is increased use of video coding requiring encoding at low bit rates. For implementing the encoding at low bit rates, frame rates smaller than 30 frames/second are applied, or variable frame rates are used to dynamically change the frame rate in order to control the encoding bit rate.

In such video coding, where the aforementioned backward prediction is applied in order to increase the encoding efficiency more, the delay time due to the backward prediction is not always 1/30 second as used before. In the application of variable frame rates, the frame rates are not constant. For example, in the case where a small frame rate is used on a temporary basis, the time interval of each frame there becomes large, and thus the time by which the output time of the decoded image of the backward-prediction-nonassociated frame should be delayed is not uniquely determined. For this reason, it becomes infeasible to correctly handle the output time interval between the decoded image of the backward-prediction-nonassociated frame and the decoded image of the backward predicted frame.

In this case, there is such potential means that a large permissible delay time is preliminarily allowed for the backward prediction and that the output time of the decoded image of the backward-prediction-nonassociated frame is always delayed by this delay time, thereby correctly handling the output time interval relative to the decoded image of the backward predicted frame. In this case, however, the large delay is always added to the output time of the decoded image, regardless of the delay time in the practical backward prediction.

When multiple reference frames are used in the backward prediction as in H.26L, the decoding of all the reference frames being temporally subsequent frames must be completed prior to the decoding of the current frame. This further increases the delay time necessary for execution of the backward prediction.

In this case, since the number of reference frames used in the backward prediction is uniquely determined as a number of temporally subsequent frames to the current frame, which were decoded prior to the current frame, the number of reference frames can be optionally changed within the range up to the predetermined upper bound of the maximum number of reference frames.

For example, supposing the upper bound of the number of reference frames is 4, the number of reference frames used in the backward prediction may be 2 as shown in FIG. 8, or 1 as shown in FIG. 11A, or 3 as shown in FIG. 11B. Since the number of reference frames can be changed in this way, the delay time necessary for execution of the backward prediction can vary largely. This leads to failure in correctly handling the output time interval between the decoded image of the backward-prediction-nonassociated frame and the decoded image of the backward predicted frame.

At this time, since the maximum number of reference frames that can be used in the backward prediction does not exceed the upper bound of the number of reference frames, the delay time according to the upper bound of the number of reference frames is a maximum delay time that can be made in execution of the backward prediction. Therefore, if the output time of the decoded image of the backward-prediction-nonassociated frame is always delayed by this delay time, the output time interval relative to the decoded image of the backward predicted frame can be correctly handled.

In this case, however, a large delay is always added to the output time of the decoded image, regardless of the number of reference frames actually used for the backward predicted frame. In the application of variable frame rates as described above, while the maximum number of reference frames can be uniquely determined, the maximum delay time cannot be uniquely determined.

In the application of the backward prediction to the video coding heretofore, it was infeasible to uniquely determine the delay time necessary for execution of the backward prediction, except for the case where use of a fixed frame rate was clear. This resulted in failure in correctly handling the output time interval between the decoded image of the backward-prediction-nonassociated frame and the decoded image of the backward predicted frame, thus posing the problem that the video output became unnatural.

In the case where multiple reference frames are used in the backward prediction, the number of reference frames can also be changed, so as to possibly vary the delay time. Therefore, there is the problem of the failure in correctly handling the time interval between the decoded image of the backward-prediction-nonassociated frame and the decoded image of the backward predicted frame. In the case where the maximum delay time is always assumed in order to cope with this problem, there arises the problem that the large delay is always added to the output time of the decoded image.

The present invention has been accomplished in order to solve the above problems, and an object of the invention is to provide a video encoding method, a video decoding method, a video encoding apparatus, a video decoding apparatus, a video encoding program, and a video decoding program capable of achieving output of decoded images at appropriate time intervals when employing backward interframe prediction.

In order to achieve the above object, a video encoding method according to the present invention is a video encoding method of implementing interframe prediction between a frame and another frame, the video encoding method comprising: outputting a maximum delay time that is incurred by backward prediction.

Likewise, a video encoding apparatus according to the present invention is a video encoding apparatus for implementing interframe prediction between a frame and another frame, the video encoding apparatus being configured to: output a maximum delay time that is incurred by backward prediction.

In the video encoding method and apparatus according to the present invention, as described above, on the occasion of encoding a moving picture consisting of a series of frames and outputting encoded data, the maximum delay time due to the backward prediction is outputted in addition to the encoded data. This enables achievement of output of decoded images at appropriate time intervals when employing the backward interframe prediction.

A video encoding program according to the present invention is a video encoding program for letting a computer to execute video encoding of implementing interframe prediction between a frame and another frame, the video encoding program letting the computer to execute: a process of outputting a maximum delay time that is incurred by backward prediction.

In the video encoding program according to the present invention, as described above, on the occasion of encoding a moving picture and outputting encoded data thereof, the computer is made to execute the process of outputting the maximum delay time, in addition to the encoded data. This enables achievement of output of decoded images at appropriate time intervals when employing the backward interframe prediction.

A video decoding method according to the present invention is a video decoding method of implementing interframe prediction between a frame and another frame, the video decoding method comprising: effecting input of a maximum delay time that can be made by backward prediction.

Likewise, a video decoding apparatus according to the present invention is a video decoding apparatus for implementing interframe prediction between a frame and another frame, the video decoding apparatus being configured to: effect input of a maximum delay time that is incurred by backward prediction.

In the video decoding method and apparatus according to the present invention, as described above, on the occasion of decoding input encoded data to generate a moving picture, the maximum delay time due to the backward prediction is entered in addition to the encoded data. This enables achievement of output of decoded images at appropriate time intervals when employing the backward interframe prediction.

A video decoding program according to the present invention is a video decoding program for letting a computer to execute video decoding of implementing interframe prediction between a frame and another frame, the video decoding program letting the computer to execute: a process of effecting input of a maximum delay time that is incurred by backward prediction.

In the video decoding program according to the present invention, as described above, on the occasion of decoding encoded data to generate a moving picture, the computer is made to execute the process of effecting the input of the maximum delay time, in addition to the encoded data. This enables achievement of output of decoded images at appropriate time intervals when employing the backward interframe prediction.

Another video encoding method is one comprising an input step of effecting input of a frame as a target for encoding; an encoding step of encoding the frame by a predetermined method; and a maximum delay time calculating step of calculating a maximum delay time of the frame from a display time of the frame, an encoding time, and a delay time that is incurred by backward prediction.

Similarly, another video encoding apparatus is one comprising input means for effecting input of a frame as a target for encoding; encoding means for encoding the frame by a predetermined method; and maximum delay time calculating means for calculating a maximum delay time of the frame from a display time of the frame, an encoding time, and a delay time that is incurred by backward prediction.

Similarly, another video encoding program is one for letting a computer to execute: an input process of effecting input of a frame as a target for encoding; an encoding process of encoding the frame by a predetermined method; and a maximum delay time calculating process of calculating a maximum delay time of the frame from a display time of the frame, an encoding time, and a delay time that is incurred by backward prediction.

In the video encoding method, apparatus, and program according to the present invention, as described above, the maximum delay time of the frame is calculated on the occasion of encoding a moving picture. This enables achievement of output of decoded images at appropriate time intervals when employing the backward interframe prediction.

Another video decoding method is one comprising an input step of effecting input of image data containing encoded data of a frame encoded by a predetermined method, a decoding time of the frame, and a maximum delay time; a decoding step of decoding the encoded data to generate a regenerated image; and an image output time calculating step of calculating an output time for display of the frame, based on the decoding time and the maximum delay time.

Similarly, another video decoding apparatus is one comprising input means for effecting input of image data containing encoded data of a frame encoded by a predetermined method, a decoding time of the frame, and a maximum delay time; decoding means for decoding the encoded data to generate a regenerated image; and image output time calculating means for calculating an output time for display of the frame, based on the decoding time and the maximum delay time.

Similarly, another video decoding program is one for letting a computer to execute: an input process of effecting input of image data containing encoded data of a frame encoded by a predetermined method, a decoding time of the frame, and a maximum delay time; a decoding process of decoding the encoded data to generate a regenerated image; and an image output time calculating process of calculating an output time for display of the frame, based on the decoding time and the maximum delay time.

In the video decoding method, apparatus, and program according to the present invention, as described above, on the occasion of decoding encoded data to generate a moving picture, the output time for display of the frame is calculated on the basis of the maximum delay time. This enables achievement of output of decoded images at appropriate time intervals when employing the backward interframe prediction.

Concerning the maximum delay time outputted in the video encoding method, encoding apparatus, and encoding program, it is preferable to define the maximum delay time as a time difference between an occurrence time of a frame to be subjected to backward interframe prediction and an occurrence time of a temporally last subsequent frame that can be used as a reference frame in backward prediction.

Concerning application of the maximum delay time, the maximum delay time may be outputted as information to be applied to the entire encoded data. In another embodiment, the maximum delay time may be outputted as information to be applied to each frame. In still another embodiment, the maximum delay time may be optionally outputted as information to be applied to a frame for which the maximum delay time is indicated and to each temporally subsequent frame after the foregoing frame.

Concerning the maximum delay time entered in the video decoding method, decoding apparatus, and decoding program, it is preferable to define the maximum delay time as a time difference between a decoding time of a frame without reversal of orders of decoding times and output times with respect to any other frame, and a decoded image output time correlated with the foregoing frame. In another embodiment, furthermore, it is preferable to set a reference for decoded image output times thereafter on the basis of the maximum delay time.

Concerning application of the maximum delay time, the maximum delay time may be entered as information to be applied to the entire encoded data. In another embodiment, the maximum delay time may be entered as information to be applied to each frame. In still another embodiment, the maximum delay time may be optionally entered as information to be applied to a frame for which the maximum delay time is indicated and to each temporally subsequent frame after the foregoing frame.

A video processing system according to the present invention is a video processing system comprising a video encoding apparatus and a video decoding apparatus, wherein the encoding apparatus is the video encoding apparatus described above and wherein the decoding apparatus is the video decoding apparatus described above.

As described above, the video processing system is constructed using the video encoding apparatus and the video decoding apparatus for effecting output and input of the maximum delay time due to the backward prediction. This substantializes the video processing system capable of achieving output of decoded images at appropriate time intervals when employing the backward interframe prediction.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 7A and 7B are diagrams showing (A) decoding and (B) output of frames in the case of the bidirectional prediction shown in FIG. 6 being carried out.

FIG. 8 is a diagram showing encoding of frames in the case of the bidirectional prediction being carried out.

FIGS. 9A and 9B are diagrams showing (A) decoding and (B) output of frames in the case of the bidirectional prediction shown in FIG. 8 being carried out.

FIGS. 11A and 11B are diagrams showing encoding of frames in the case of the bidirectional prediction being carried out.

DESCRIPTION OF THE PREFERRED EMBODIMENTS

The preferred embodiments of the video encoding method, video decoding method, video encoding apparatus, video decoding apparatus, video encoding program, and video decoding program according to the present invention will be described below in detail with reference to the drawings. The same elements will be denoted by the same reference symbols throughout the description of the drawings, without redundant description thereof.

Figure 1:
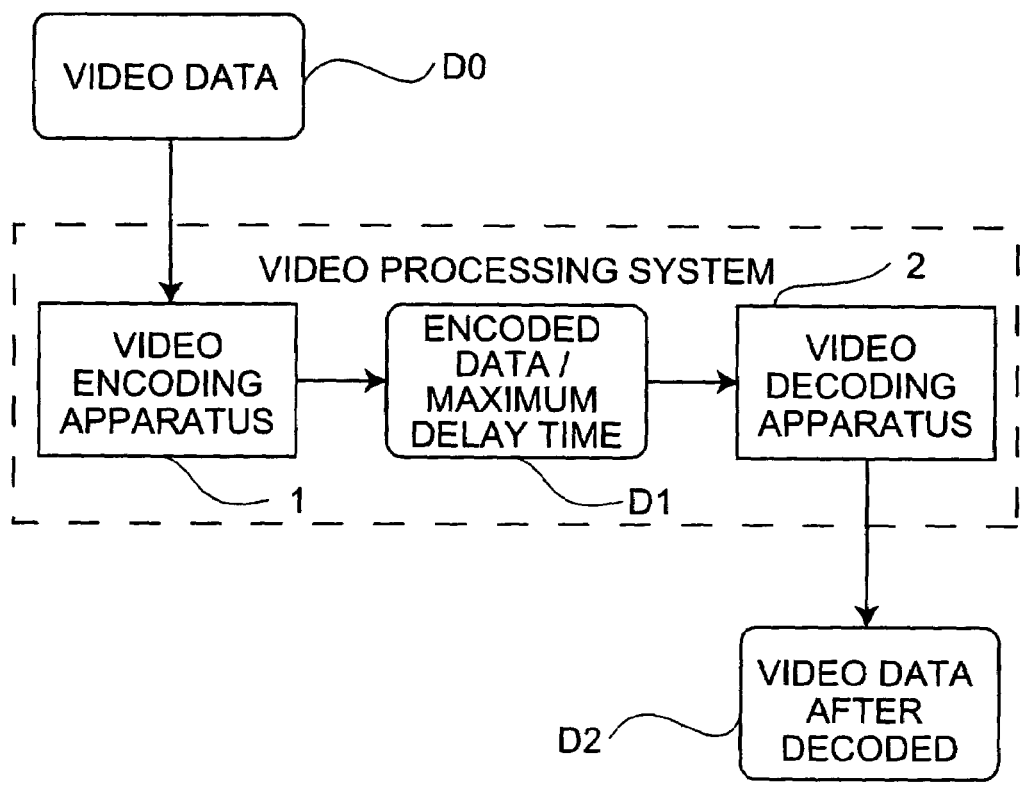
FIG. 1 is a block diagram showing the schematic structure of the video encoding apparatus, video decoding apparatus, and video processing system.

First, the encoding and decoding of moving picture in the present invention will be schematically described. FIG. 1 is a block diagram showing the schematic structure of the video encoding apparatus, video decoding apparatus, and video processing system according to the present invention. The video processing system is comprised of video encoding apparatus 1 and video decoding apparatus 2. The video encoding apparatus 1, video decoding apparatus 2, and video processing system will be described below together with the video encoding method and video decoding method executed therein.

The video encoding apparatus 1 is a device configured to encode video data D0 consisting of a series of images (frames) and output encoded data D1, for transmission, for storage and regeneration of moving pictures. The video decoding apparatus 2 is a device configured to decode input encoded data D1 to generate decoded moving picture data D2 consisting of a series of frames. The video encoding apparatus 1 and the video decoding apparatus 2 are connected by a predetermined wired or wireless data transmission line, in order to transmit necessary data such as the encoded data D1 and others.

In the encoding of the moving picture carried out in the video encoding apparatus 1, as described previously, the interframe prediction is carried out between a frame of video data D0 entered as a target for encoding, and another frame as a reference frame, thereby reducing the redundancy in the video data. In the video processing system shown in FIG. 1, the video encoding apparatus 1 carries out the backward interframe prediction from a temporally subsequent frame for interframe prediction. Furthermore, this video encoding apparatus 1 outputs the maximum delay time that is incurred by the backward prediction, in addition to the encoded data D1.

In correspondence to such video encoding apparatus 1, the video decoding apparatus 2 is configured to effect input of the maximum delay time that is incurred by the backward prediction, in addition to the encoded data D1 from the video encoding apparatus 1. Then the video decoding apparatus 2 decodes the encoded data D1 with reference to the input maximum delay time to generate the video data D2.

By the video encoding apparatus 1 and video encoding method configured to output the maximum delay time, the video decoding apparatus 2 and video decoding method configured to effect input of the maximum delay time, and the video processing system equipped with those apparatus 1, 2, which are adapted for the backward interframe prediction as described above, it becomes feasible to achieve output of decoded images at appropriate time intervals in execution of the interframe prediction using the backward interframe prediction.

Concerning the maximum delay time outputted in the video coding, for example, the maximum delay time can be defined as a time difference between an occurrence time of a frame to be subjected to the backward interframe prediction and an occurrence time of a temporally last subsequent frame that can be used as a reference frame for backward prediction.

As for the maximum delay time entered in the video decoding, for example, the maximum delay time (hereinafter referred to as dpb_output_delay) can be defined as a time difference between a decoding time of a frame without delay due to backward interframe prediction and without reversal of orders of decoding times and output times with respect to other frame (the decoding time will be referred to hereinafter as Tr) and a decoded image output time correlated with the pertinent frame (the output time will be referred to hereinafter as To). In this case, preferably, a reference for decoded image output times thereafter is set based on the maximum delay time.

Application of the maximum delay time can be a method of applying it to entire encoded data or a method of applying it to each frame. Another application method is a method of applying the maximum delay time to each of the frames subsequent to the announcement of the information of the maximum delay time, i.e., to the frame for which the maximum delay time is indicated and to each of the frames temporally subsequent to that frame. The output, input, application, etc. of the maximum delay time in these methods will be specifically detailed later.

The processing corresponding to the video encoding method executed in the foregoing video encoding apparatus 1 can be substantialized by the video encoding program for letting a computer to execute the video coding. The processing corresponding to the video decoding method executed in the video decoding apparatus 2 can be substantialized by the video decoding program for letting a computer to execute the video decoding.

For example, the video encoding apparatus 1 can be constructed of a CPU connected to a ROM storing software programs necessary for respective operations of the video coding and a RAM temporarily saving data during execution of a program. In this configuration, the video encoding apparatus 1 can be substantialized by letting the CPU to execute the predetermined video encoding program.

Similarly, the video decoding apparatus 2 can be constructed of a CPU connected to a ROM storing software programs necessary for respective operations of the video decoding and a RAM temporarily saving data during execution of a program. In this configuration, the video decoding apparatus 2 can be substantialized by letting the CPU to execute the predetermined video decoding program.

The above-stated program for letting the CPU to execute the processes for video encoding or for video decoding can be distributed in a form in which it is recorded in a computer-readable recording medium. Such recording media include, for example, magnetic media such as hard disks and floppy disks, optical media such as CD-ROM and DVD-ROM, magnetooptical media such as floptical disks, or hardware devices, for example, such as RAM, ROM, and semiconductor nonvolatile memories, specially mounted to execute or store program commands.

The video encoding apparatus, the video decoding apparatus, the video processing system provided therewith shown in FIG. 1, and the video encoding method and video decoding method corresponding thereto will be described with specific embodiments. The description hereinafter will be based on the presumption that the encoding and decoding operations of motion video are implemented based on H.26L, and parts not specifically described about the operation in video encoding will be pursuant to the operation in H.26L. It is, however, noted that the present invention is not limited to H.26L.

First Embodiment

First, the first embodiment of the present invention will be described. The present embodiment will describe an embodied form of encoding at a fixed frame rate. In the encoding according to the present embodiment, the maximum number of reference frames used for backward prediction is first determined, the maximum delay time is calculated thereafter from this maximum number of reference frames and the frame rate used in encoding, and the maximum delay time is then outputted. In the decoding according to the present embodiment, on the occasion of decoding a backward-prediction-nonassociated frame, an output time of a decoded image thereof is delayed by the input maximum delay time. The delay time for the output time is uniformly applied to every frame thereafter, so as to prevent the output time interval between the decoded image of the backward-prediction-nonassociated frame and the decoded image of the backward predicted frame from deviating from the original interval.

In the encoding, since the upper bound of the number of reference frames used is preliminarily determined, the maximum number of reference frames used for backward prediction is first determined within the range not exceeding the upper bound. Then, based on the frame rate used for encoding, which is also preliminarily determined, the maximum delay time is calculated as a time interval of one frame or two or more frames according to the maximum number of reference frames used for backward prediction.

Figure 2:
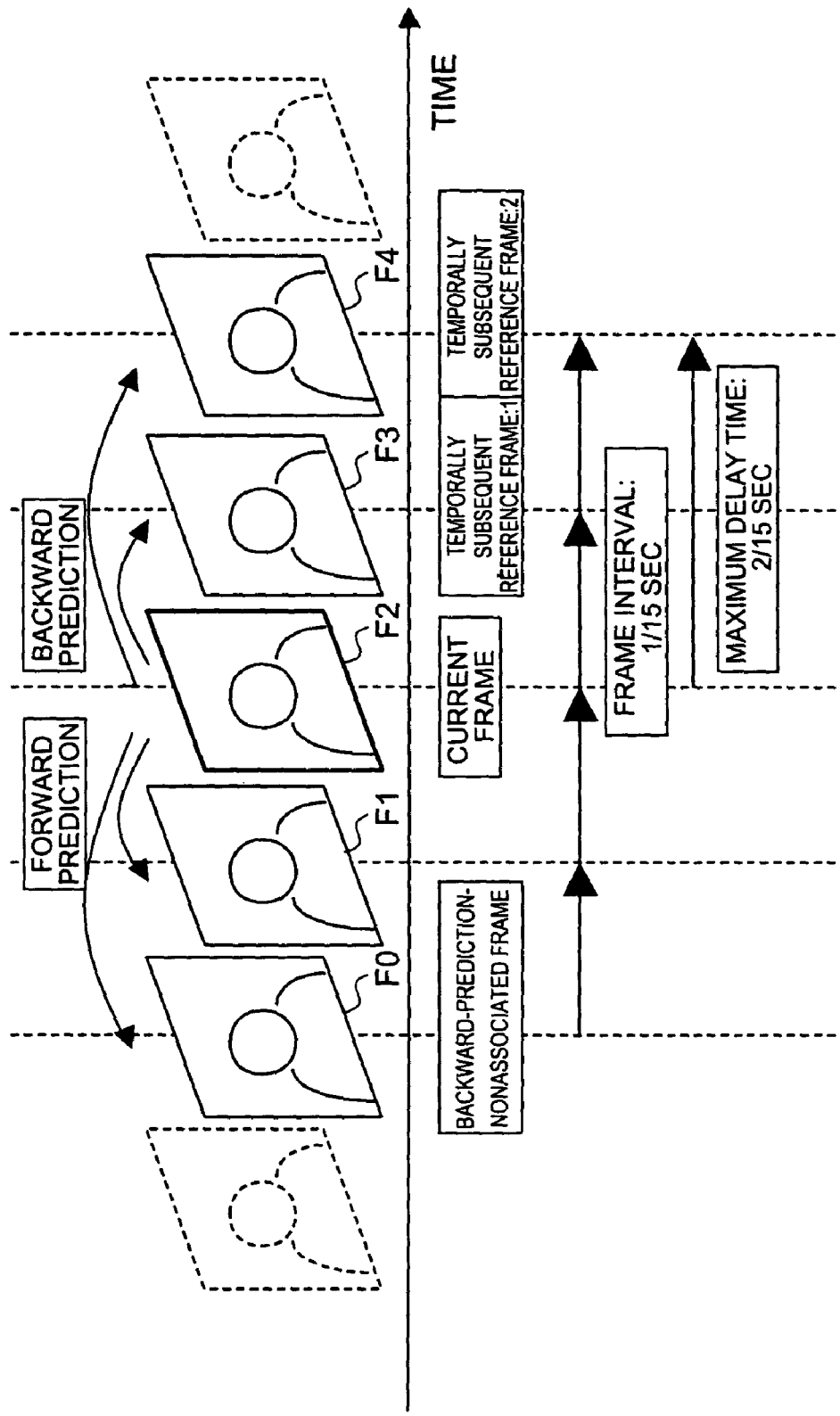
FIG. 2 is a diagram showing an example of encoding of frames in the case of the bidirectional prediction being carried out.

FIG. 2 is a diagram showing an example of encoding of a frame in execution of bidirectional prediction. Here this FIG. 2 shows the example in which reference frames used for the current frame F2 are two temporally previous frames F0, F1 before the current frame F2 and two temporally subsequent frames F3, F4 after the current frame F2.

In the case where the maximum number of reference frames used for backward prediction is 2 and where the frame rate is 15 frames/second, as shown in FIG. 2, the time interval of one frame is $1/15$ second. In this case, therefore, the maximum delay time is $2 \times (1/15) = 2/15$ second.

In the encoding operation, encoding of each frame hereinafter is controlled so as not to carry out backward prediction requiring a delay time over the maximum delay time. Specifically, a sequence of encoding of frames is controlled so that any reference frame used in backward prediction, i.e., any temporally subsequent frame after the current frame is not encoded and outputted prior to the current frame over the maximum number of reference frames used in backward prediction.

Figure 3:
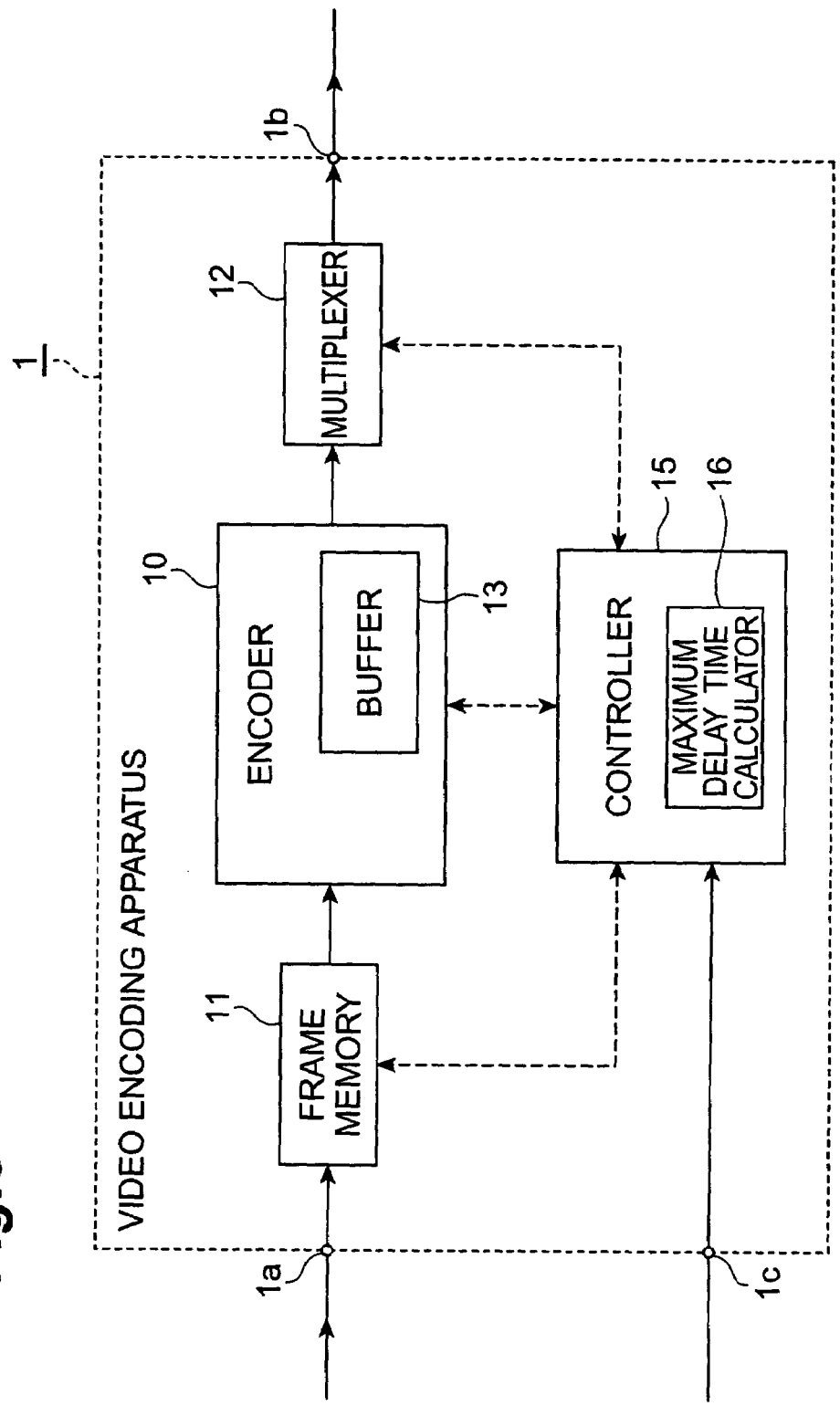
FIG. 3 is a block diagram showing an example of the configuration of the video encoding apparatus.

FIG. 3 is a block diagram showing an example of the configuration of the video encoding apparatus used in the present embodiment. The video encoding apparatus 1 shown in FIG. 3 is comprised of an encoder 10 for encoding a frame (image) by the predetermined method, a controller (CPU) 15 for controlling operations of respective parts in the encoding apparatus 1, a frame memory 11 disposed between input terminal 1a and encoder 10, and a multiplexer 12 disposed between output terminal 1b and encoder 10. The controller 15 has a maximum delay time calculator 16 for calculating the maximum delay time, as a function thereof. The encoder 10 is provided with an output buffer 13.

In the video encoding in the present encoding apparatus 1, conditions for encoding of video are entered through input terminal 1c. In this entry of the conditions, the encoding conditions are generally selected or entered through an input device such as a keyboard. In the present embodiment, specifically, the encoding conditions entered include the size of a frame as a target for encoding, the frame rate, and the bit rate and, in addition thereto, the encoding conditions also include a predictive reference structure of the video (whether backward prediction is applied), the number of frames temporarily stored and used as reference frames (corresponding to the capacity of output buffer 13), and the number of reference frames used in backward prediction. These conditions may be set so as to vary with time. The encoding conditions entered through the input terminal 1c are stored into the controller 15.

With a start of the encoding operation, the controller 15 sends the encoding conditions to the encoder 10, where the encoding condition are set. On the other hand, a frame as an encoded object is entered through the input terminal 1a and is fed through the frame memory 11 to the encoder 10 to be encoded therein. The input frame is temporarily saved in the frame memory 11, because the order of frames is changed for execution of backward prediction. For example, in the example shown in FIG. 2, frame F2 is entered through the input terminal 1a before frames F3, F4, but it is encoded after the frames F3, F4; therefore, the frame F2 is temporarily saved in the frame memory 11.

The encoder 10 encodes the frame on the basis of the algorithm of H.26L. Then the encoded data is fed to the multiplexer 12 to be multiplexed with other related information and then the multiplexed data is outputted through the output terminal 1b. The frame used for the prediction is reproduced in the encoder 10 and is stored as a reference frame for encoding of the next frame into the buffer 13.

In the present embodiment, the maximum delay time calculator 16 of the controller 15 calculates the maximum delay time dpb_output_delay, based on the number of reference frames and the frame rate entered through the input terminal 1c and used for the backward prediction. Then the multiplexer 12 adds the maximum delay time to encoded image data. In addition, an identifier (N) indicating a display turn for identification of each frame is also added together to the encoded data of each frame.

It is a matter of course that when the backward prediction is not applied, the number of reference frames used is zero and thus the value of dpb_output_delay is zero.

It is assumed in the present embodiment that a syntax for transmitting the maximum delay time is added to the encoded data syntax in H.26L, in order to implement the output of the maximum delay time in the encoding and the input of the maximum delay time in the decoding. In this example the new syntax is added into the Sequence Parameter Set being a syntax for transmitting the information to be applied to the entire encoded data.

The parameter dpb_output_delay is defined as a syntax for carrying the maximum delay time. It is assumed here that the parameter dpb_output_delay uses the same time unit used in the other syntaxes indicating the time in H.26L and that it indicates the maximum delay time in the time unit of 90 kHz. A numeral indicated in the time unit is encoded and transmitted by a 32-bit unsigned fixed-length code. For example, where the maximum delay time is $2/15$ second as described above, dpb_output_delay is $(2/15) \times 90000 = 12000$.

In the decoding operation, the maximum delay time carried by dpb_output_delay is decoded, and an output time of a decoded image is delayed using it.

Figure 4:
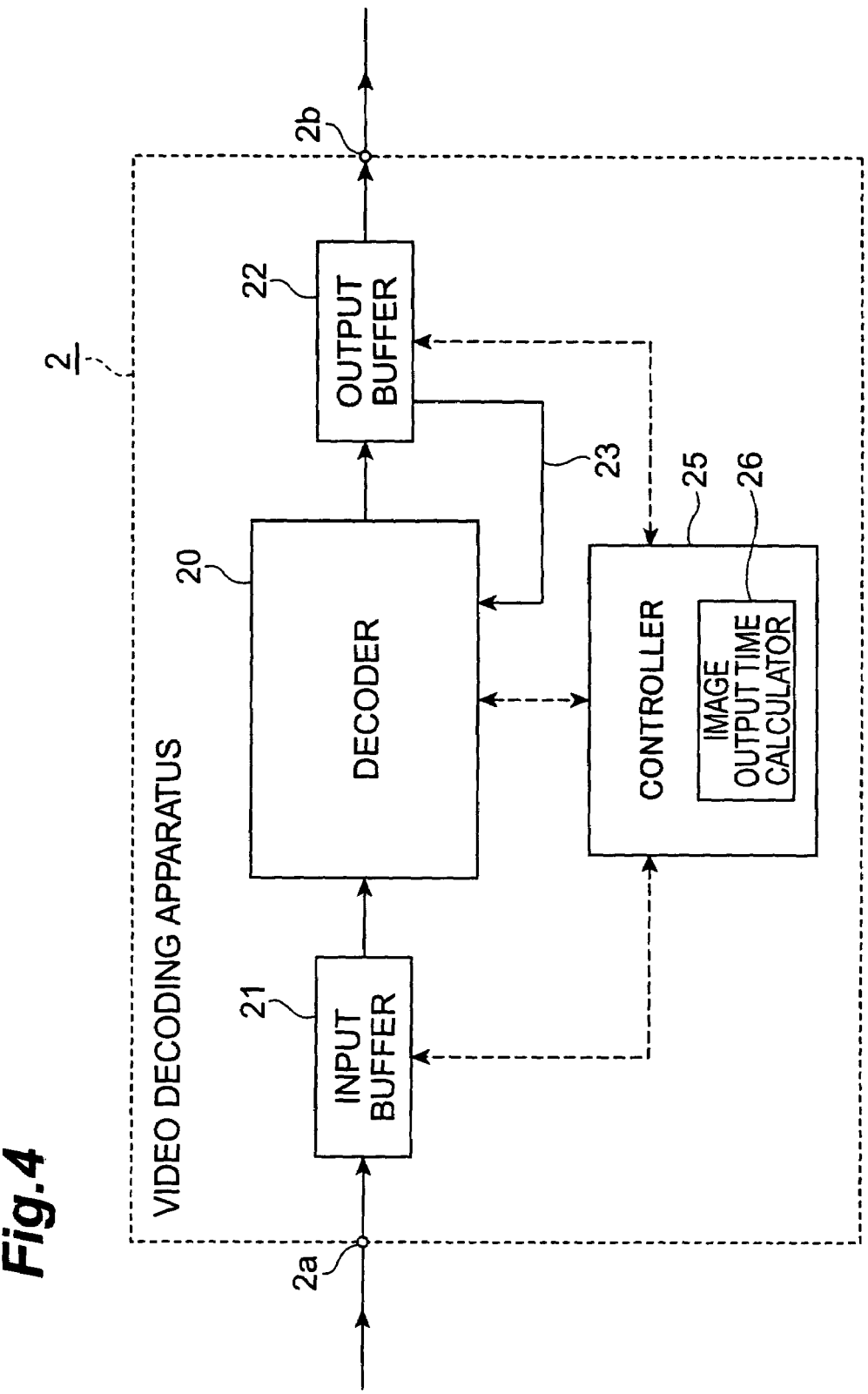
FIG. 4 is a block diagram showing an example of the configuration of the video decoding apparatus.

FIG. 4 is a block diagram showing an example of the configuration of the video decoding apparatus used in the present embodiment. The video decoding apparatus 2 shown in FIG. 4 is comprised of a decoder 20 for decoding encoded data to generate a regenerated image, a controller (CPU) 25 for controlling operations of respective parts in the decoding apparatus 2, an input buffer 21 disposed between input terminal 2a and decoder 20, and an output buffer 22 disposed between output terminal 2b and decoder 20. The controller 25 has an image output time calculator 26 for calculating an output time for display of a frame, as a function thereof.

In the video decoding in the present decoding apparatus 2, data as a decoded object is entered through the input terminal 2a. This data is multiplexed data of the encoded data of each frame encoded by the encoding apparatus 1 shown in FIG. 3, the maximum delay time dpb_output_delay, and the identifier (N) indicating the display turn of each frame.

The input data is stored into the input buffer 21. When a command from the controller 25 indicates arrival of a decoding time, data of one frame is entered from the input buffer 21 into the decoder 20 and is then decoded according to the algorithm of H.26L. The frame regenerated in this way is stored into the output buffer 22. The frame in the output buffer 22 is fed back via line 23 to decoder 20 to be used as a reference frame for decoding of the next frame.

On the other hand, the maximum delay time dpb_output_delay, the frame rate, and the identifier (N) of each frame decoded in the decoder 20 are fed into the controller 25. Then the image output time calculator 26 of the controller 25 calculates the output time of each frame from these data in accordance with the equation below.

$$To(n) = \text{dpb\_output\_delay} + N \times \text{frame interval}$$

In this equation, the frame interval is determined from the frame rate.

Supposing dpb_output_delay is $2/15$ second and the frame interval is $1/15$ second as in the example shown in FIG. 2, the output times of the respective frames are calculated as follows according to the above equation.

$N=0, To(0) = 2/15$ $N=1, To(1) = 3/15$ $N=2, To(2) = 4/15$ $N=3, To(3) = 5/15$

Figure 5:
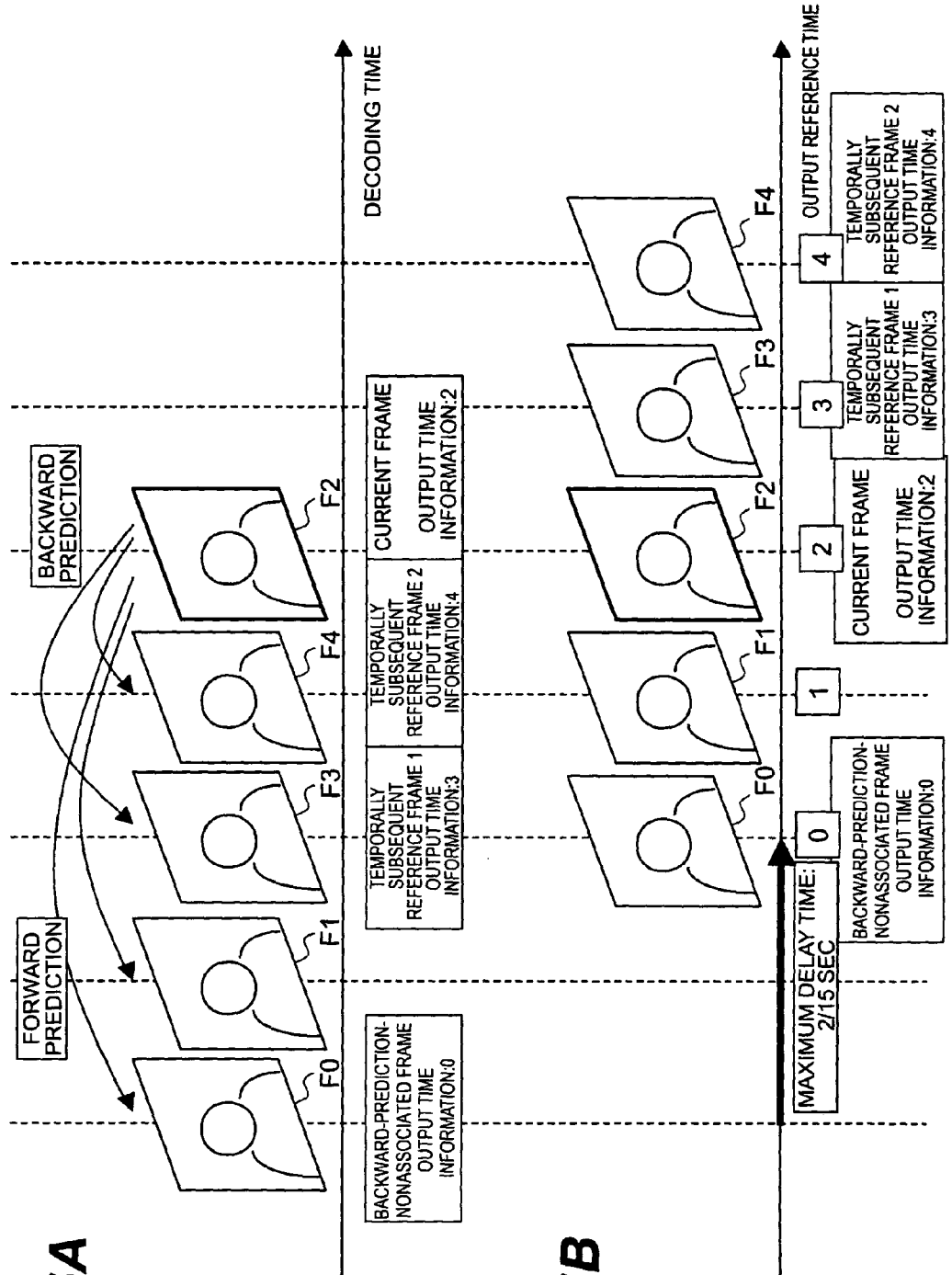
FIGS. 5A and 5B are diagrams showing (A) decoding and (B) output of frames in the case of the bidirectional prediction shown in FIG. 2 being carried out.
Figure 6:
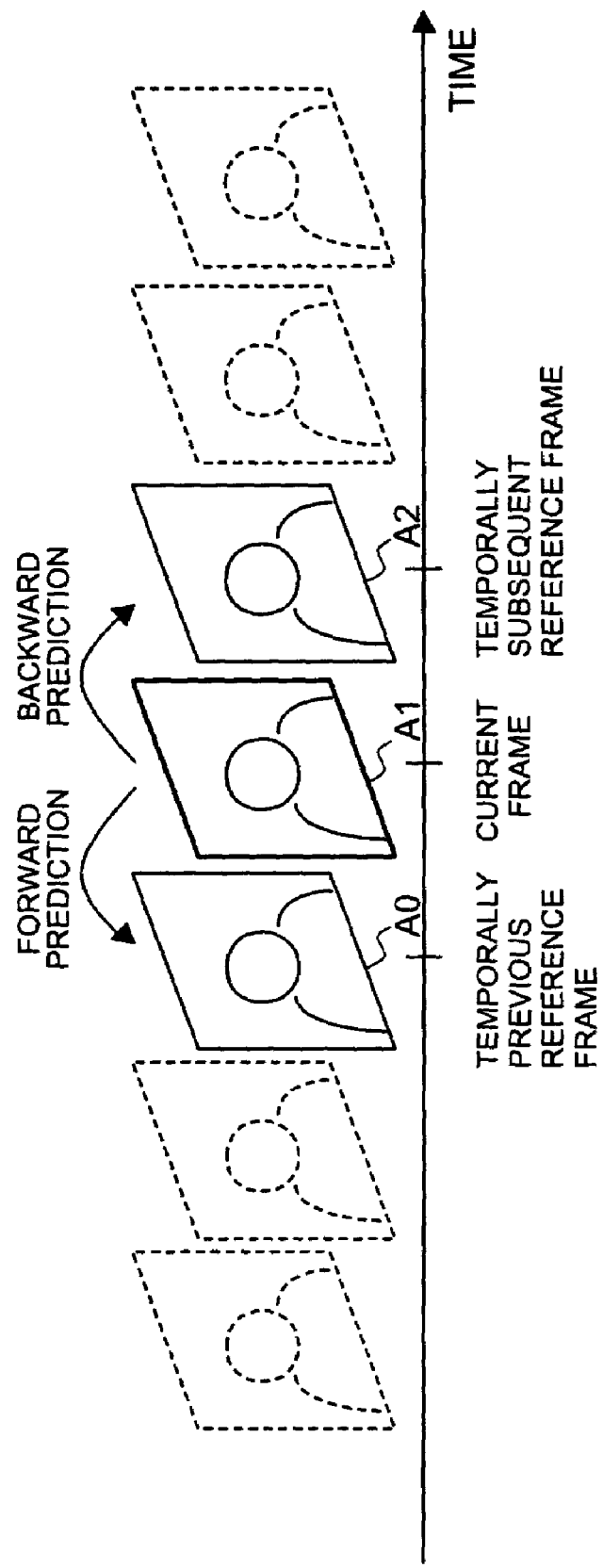
FIG. 6 is a diagram showing encoding of frames in the case of the bidirectional prediction being carried out.
Figure 10A:
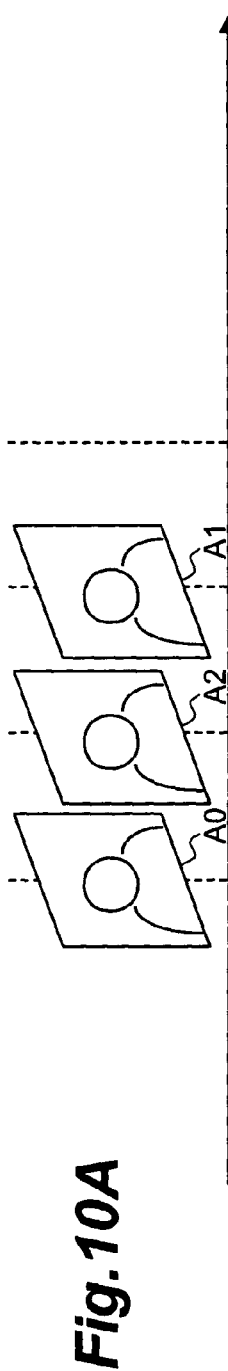
FIGS. 10A to 10C are diagrams showing (A) decoding, (B) output, and (C) delayed output of frames in the case of the bidirectional prediction being carried out.
Figure 10B:
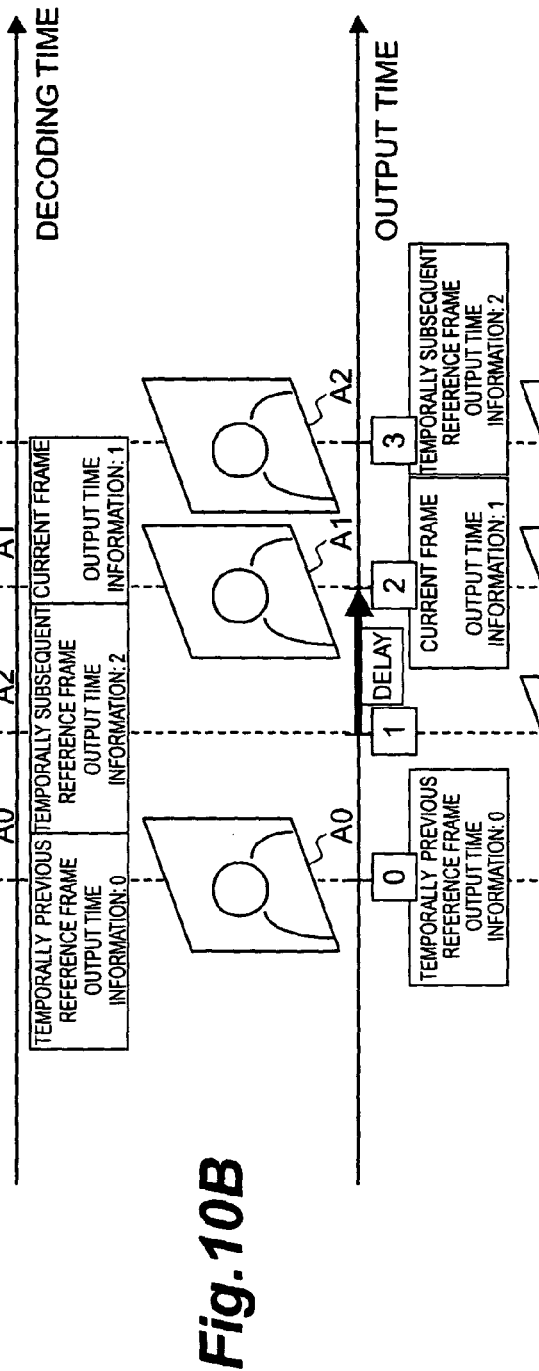
Figure 10C:
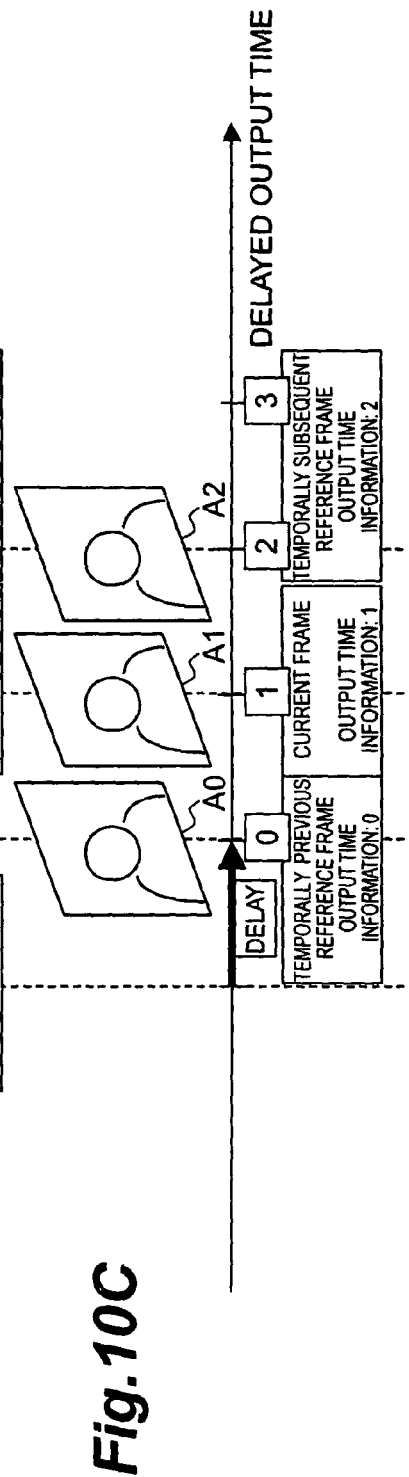

According to the output times To(n) obtained in this way by the controller 25, the frames in the output buffer 22 are outputted at constant intervals to the output terminal 2b, as indicated by frames F0, F1, F2, and F3 shown in FIG. 5B. Although not illustrated, the output terminal 2b is connected to a display device such as a monitor.

FIGS. 5A and 5B are diagrams showing (A) decoding and (B) output of the frames in the case of the bidirectional prediction shown in FIG. 2. It is assumed in the decoding operation that the encoded data of the frames is decoded in the order necessary for execution of the interframe prediction, the intervals thereof are constant time intervals according to the frame rate, and the time necessary for the decoding operation is negligible for each frame, regardless of whether interframe prediction is applied and regardless of the directions of interframe prediction. In this case, the maximum delay time necessary for execution of the backward prediction in the backward predicted frame is equal to a time interval of a frame or frames according to the maximum number of reference frames used for the backward prediction. This time is carried as a maximum delay time by dpb_output_delay. Accordingly, for outputting a decoded image, an output time thereof is delayed by the maximum delay time.

In practice, the decoding intervals of the respective frames are not constant, and can vary depending upon such factors as variation in encoding bits of the frames. The time necessary for the decoding operation of each frame can also vary according to whether the frame is a backward predicted frame or according to encoding bits of each frame.

For delaying the output time, therefore, the reference is set at the time when the decoded image is obtained for the backward-prediction-nonassociated frame F0 without delay due to backward prediction and without reversal of orders of decoding times and output times with respect to any other frame, as shown in FIGS. 5A and 5B. Namely, a time obtained by delaying the time when the decoded image is obtained, by the maximum delay time announced by dpb_output_delay is defined as a time equal to the output time correlated with this decoded image, and is used as a reference time in output of decoded images. The decoded images F1-F4 thereafter are outputted when this reference time agrees with a time equal to an output time correlated with each decoded image.

For example, where the maximum delay time is $2/15$ second as described above, a time at a delay of $2/15$ second from the time when the decoded image is obtained for the backward-prediction-nonassociated frame, is defined as a time equal to the output time correlated with this decoded image and is used as a reference time in output of decoded images thereafter.

According to the circumstances, conceivably, the maximum delay time is not announced on purpose, in order to simplify the encoding or decoding operation. For such cases, the syntax for announcing the maximum delay time may be arranged to be omissible on the presumption that a flag to indicate the presence or absence of the syntax is transmitted prior to the syntax for transmitting the maximum delay time.

In the case where the announcement of the maximum delay time is omitted, the encoding operation may be preliminarily stipulated, for example, so as not to use the backward prediction or so that the number of reference frames used in backward prediction can be optionally altered within the range not exceeding the upper bound of the number of reference frames.

The decoding operation may be configured to perform in conformity with the stipulation in the encoding operation, for example, when backward prediction is not applied, there occurs no delay necessary for execution of backward prediction; or, the decoding operation may also be configured so that the number of reference frames used in backward prediction can be optionally altered within the range not exceeding the upper bound of the number of reference frames, i.e., the delay time can vary large. In this case, the decoding operation may be configured to always perform processing assuming an expected maximum delay time, or the decoding operation may be configured to allow variation of output time intervals of decoded images and perform simplified processing without consideration to the delay time of each frame.

The present embodiment was described on the assumption that the operations were implemented based on H.26L, but it is noted that the video encoding methods to which the present invention can be applied are not limited to H.26L and that the present invention can be applied to various video encoding methods using the backward interframe prediction.

In the present embodiment, the syntax by fixed-length codes was added as a syntax for transmitting the maximum delay time into the Sequence Parameter Set, but it is noted that the codes and syntax for transmitting it, or the time unit for expressing the maximum delay time are not limited to these, of course. The fixed-length codes may be replaced by variable-length codes, and the maximum delay time can be transmitted by any of various syntaxes that can convey information to be applied to the entire encoded data.

For example, in H.26L, a syntax may be added into a Supplemental Enhancement Information Message. In a case using another video encoding method, the maximum delay time may be transmitted by a syntax for transmitting the information to be applied to the entire encoded data in the pertinent encoding method. In another case, the maximum delay time may also be transmitted outside the encoded data in the video encoding method as in ITU-T Recommendation H.245 used for conveying control information in communication using H.263.

Second Embodiment

The second embodiment of the present invention will be described below. The present embodiment will describe an embodied form of encoding at variable frame rates. The operations in the encoding and decoding according to the present embodiment are basically much the same as in the first embodiment. Since the present embodiment uses the variable frame rates, it involves an operation at low frame rates to avoid execution of the backward prediction requiring the delay time over the preliminarily calculated maximum delay time, in addition to the operation in encoding in the first embodiment, so as to prevent the output time interval between the decoded image of the backward-prediction-nonassociated frame and the decoded image of the backward predicted frame from deviating from the original interval even with variation of frame rates.

Since in the encoding operation the upper bound of the number of reference frames is preliminarily determined, the maximum number of reference frames used for backward prediction is first determined within the range not exceeding the upper bound. Then the maximum frame time interval is determined based on a target frame rate preliminarily determined in control of encoding bit rates, and the maximum delay time is calculated as a time interval of one frame or two or more frames according to the maximum number of reference frames used in backward prediction and the maximum frame time interval.

In the encoding operation, encoding of each frame thereafter is controlled so as to avoid the backward prediction requiring the delay time beyond the maximum delay time. Specifically, the order of encoding of frames is controlled so as to prevent any reference frame used in backward prediction, i.e., any temporally subsequent frame after the current frame, that goes beyond the maximum number of reference frames used in backward prediction, from being encoded and outputted prior to the current frame.

In addition, when the encoding frame rate becomes temporarily small because of control of encoding bit rates, so as to make the frame time interval in that case larger than the maximum frame time interval, encoding of each frame is controlled so as not to apply backward prediction to encoding of the frame there.

The present embodiment is substantially identical to the first embodiment in that the maximum delay time is outputted in the encoding, in that the syntax dpb_output_delay to transmit the maximum delay time is added to the encoded data syntax in order to effect input thereof in the decoding, and in the definition of the syntax.

In the present embodiment, the decoding operation is arranged to decode the maximum delay time announced by dpb_output_delay and delay the output time of the decoded image by use of it. This processing is also the same as in the first embodiment.

Third Embodiment

The third embodiment of the present invention will be described below. The present embodiment will describe an embodied form in which the maximum delay time is optionally announced for each frame and is thus flexibly changeable. The operations in the encoding and decoding according to the present embodiment are basically similar to those in the first embodiment or the second embodiment.

In the present embodiment, the syntax dpb_output_delay to transmit the maximum delay time, which was defined in the first embodiment, is arranged to be added into the Picture Parameter Set being a syntax to carry the information applied to each frame instead of the syntax to carry the information applied to the entire encoded data. The syntax dpb_output_delay herein is configured to indicate the maximum delay time in the time unit of 90 kHz, as in the case of the first embodiment, and a numeral expressed in the time unit is encoded and transmitted by a 32-bit unsigned fixed-length code.

The present embodiment is much the same as the first embodiment, as to the calculation of the maximum delay time in encoding and as to the delay of the output time of the decoded image by use of the maximum delay time in decoding. The configurations of the video encoding apparatus and video decoding apparatus used in the present embodiment are much the same as those shown in FIGS. 3 and 4 about the first embodiment.

Let us explain how to determine the maximum delay time dpb_output_delay of each frame in the present embodiment. In the encoding apparatus 1 shown in FIG. 3, the controller 15 calculates the delay time (D) due to the backward prediction by the method as described in the first embodiment and determines the encoding time Tr(n) of each frame. When a display time Tin(n) of each frame is fed from frame memory 11, dpb_output_delay(n) of that frame is calculated as follows.

$$\text{dpb\_output\_delay}(n) = Tin(n) + D - Tr(n)$$

This value of dpb_output_delay is correlated with the pertinent frame and is multiplexed in the multiplexer 12.

In the present embodiment, the time Tr(n) for encoding of each frame is also encoded together. Taking FIG. 2 as an example, D=2/15 second, and Tin(n)=0, 1/15, 2/15, 3/15, or 4/15 (n=0, 1, 2, 3, or 4). Because of change in the order of encoding, Tr(n) becomes as follows: Tr(n)=0, 1/15, 4/15, 2/15, or 3/15 (n=0, 1, 2, 3, or 4). Here dpb_output_delay(n) of each frame is obtained as follows.

$n = 0$, dpb_output_delay(0)
$= 0 + 2/15 - 0 = 2/15$ $n = 1$, dpb_output_delay(1)
$= 1/15 + 2/15 - 1/15 = 2/15$ $n = 2$, dpb_output_delay(2)
$= 2/15 + 2/15 - 4/15 = 0$ $n = 3$, dpb_output_delay(3)
$= 3/15 + 2/15 - 2/15 = 3/15$ $n = 4$, dpb_output_delay(4)
$= 4/15 + 2/15 - 3/15 = 3/15$ On the other hand, in the decoding apparatus 2 shown in FIG. 4, the decoder 20 sends dpb_output_delay(n) and Tr(n) of each frame to the controller 25 and the controller 25 calculates the output time To(n) of each frame on the basis of the equation below.

$$To(n) = Tr(n) + \text{dpb\_output\_delay}$$

Taking FIG. 2 as an example, To(n) for each frame is calculated as follows according to the above definition, based on Tr(n)=0, 1/15, 4/15, 2/15, or 3/15 (n=0, 1, 2, 3, or 4) and dpb_output_delay(n)=2/15, 2/15, 0, 3/15, or 3/15 (n=0, 1, 2, 3, or 4).

$n=0$, $To(0)=0+2/15=2/15$ $n=1$, $To(1)=1/15+2/15=3/15$ $n=2$, $To(2)=4/15+0=4/15$ $n=3$, $To(3)=2/15+3/15=5/15$ $n=4$, $To(4)=3/15+3/15=6/15$

Namely, all the images are displayed with the delay of 2/15 second and at constant intervals on the monitor. It is a matter of course that when the backward prediction is not applied, the number of reference frames used therefor is zero and the value of dpb_output_delay(n) is thus zero.

Since the maximum delay time defines the reference time in output of decoded images from the time when the decoded image of the backward-prediction-nonassociated frame is acquired, it is enough to transmit the maximum delay time only for the backward-prediction-nonassociated frame. It is therefore possible to employ, for example, a configuration wherein the syntax for transmitting the maximum delay time is arranged to be omissible on the presumption that a flag indicating the presence or absence of the syntax is transmitted prior thereto. The syntax may also be arranged to be optionally omitted for the backward-prediction-nonassociated frame, provided that the maximum delay time transmitted before is applied in that case where the maximum delay time is not transmitted.

The syntax for each frame in the present embodiment may also be used simultaneously with the syntax for the entire encoded data as defined in the first embodiment. In this case, the syntax for each frame is omissible, provided that a flag indicating the presence or absence of the syntax is transmitted prior thereto as described above. The maximum delay time transmitted in the syntax for the entire encoded data is continuously applied before the maximum delay time is transmitted in the syntax for each frame. After it is updated by the syntax for each frame, the time delayed based thereon is used as a reference time in output of every decoded image thereafter.

The present embodiment was described on the assumption that it was substantialized based on H.26L, but it is noted that the video encoding methods to which the present invention can be applied are not limited to H.26L and that the present invention can be applied to various video encoding methods using the backward interframe prediction.

In the present embodiment the syntax for transmitting the maximum delay time was the syntax by fixed-length codes added into the Picture Parameter Set, and it is a matter of course that the codes and syntax for transmitting it, or the time unit for expressing the maximum delay time are not limited to these, of course. The fixed-length codes can be replaced by variable-length codes, and the maximum delay time can be announced in any of various syntaxes capable of announcing the information to be applied to each frame.

For example, the syntax may be added into a Supplemental Enhancement Information Message in H.26L. When another video encoding method is applied, it is possible to use a syntax for announcing information to be applied to each frame in the pertinent encoding method. In addition, the information may also be announced outside the encoded data in the video encoding method as in ITU-T Recommendation H.245 used for announcement of control information in communication using H.263.

The video encoding method, video decoding method, video encoding apparatus, video decoding apparatus, video processing system, video encoding program, and video decoding program according to the present invention provide the following effect, as detailed above. Namely, when a moving picture consisting of a series of frames is encoded by the backward interframe prediction to be outputted, it becomes feasible to achieve output of decoded images at appropriate time intervals when employing the backward interframe prediction, by the video encoding method, encoding apparatus, and encoding program configured to output the maximum delay time due to the backward prediction, the video decoding method, decoding apparatus, and decoding program configured to effect input of the maximum delay time, and the video processing system using them.

Particularly, different from the prior art, the output times are not absolute values, but relative values from the decoding time Tr; therefore, the invention provides the effect of capability of accurately describing and transmitting the value of the maximum delay time dpb_output_delay by a small number of bits, even in the case that the frame rate is variable. Even if the decoding time Tr has a shift or is not received, a corresponding image will be outputted with a delay of dpb_output_delay from the time of completion of decoding, thus presenting the advantage that images are outputted at correct intervals.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A decoding apparatus for decoding encoded pictures and outputting the decoded pictures, comprising:
at least one coded picture buffer in which the encoded pictures are storable, wherein each of the encoded picture is associated with decoding timing information indicative of a delay time to be held for decoding and output delay information indicative of a delay time to be held for output;
a decoder configured to perform a decoding operation on each of the encoded pictures at a timing in accordance with the decoding timing information;
at least one decoded picture buffer in which the decoded pictures are storable; and
an output controller configured to output each of the decoded pictures from the at least one decoded picture buffer at a timing determined based on the decoding timing information and the output delay information.

2. A decoding apparatus according to claim 1, wherein the decoding timing information is indicative of a delay time for each of the encoded pictures to wait before being removed from the at least one coded picture buffer.

3. A decoding apparatus according to claim 1, wherein the decoding timing information is indicative of a decoding time of a respective encoded picture.

4. A decoding apparatus according to claim 1, wherein the output delay information is indicative of a delay time for each of the decoded pictures to wait before being outputted from the at least one decoded picture buffer.

5. A decoding apparatus according to claim 1, wherein the output delay information is indicative of a maximum delay time.

6. A method for decoding encoded pictures and outputting the decoded pictures performed by a decoding apparatus, comprising:
in the decoding apparatus, storing the encoded pictures in at least one coded buffer, wherein each of the encoded picture is associated with decoding timing information indicative of a delay time to be held for decoding and output delay information is indicative of a delay time to be held for output;
performing a decoding operation on each of the encoded pictures at a timing in accordance with the decoding timing information;

storing the decoded pictures in at least one decoded picture buffer; and outputting each of the decoded pictures from the at least one decoded picture buffer at a timing determined based on the decoding timing information and the output delay information.

7. A method according to claim 6, wherein the decoding timing information is indicative of a delay time for each of the encoded pictures to wait before being removed from the at least one coded picture buffer.

8. A method according to claim 6, wherein the decoding timing information is indicative of a decoding time of a respective encoded picture.

9. A method according to claim 6, wherein the output delay information is indicative of a delay time for each of the decoded pictures to wait before being outputted from the at least one decoded picture buffer.

10. A method of according to claim 6, wherein the output delay information is indicative of a maximum delay time.

\* \* \* \* \*

UNITED STATES PATENT AND TRADEMARK OFFICE
CERTIFICATE OF CORRECTION

PATENT NO. : 7,596,178 B2   Page 1 of 1
APPLICATION NO. : 10/671527
DATED : September 29, 2009
INVENTOR(S) : Satoru Adachi et al.

It is certified that error appears in the above-identified patent and that said Letters Patent is hereby corrected as shown below:

In the Claims

In column 18, claim 1, lines 27-28, after "each of the encoded" replace "picture" with --pictures--.

In column 18, claim 6, line 60, before "is associated with decoding" replace "picture" with --pictures--.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,596,178 B2
APPLICATION NO. : 10/671527
DATED : September 29, 2009
INVENTOR(S) : Adachi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Fourteenth Day of December, 2010

David J. Kappos
*Director of the United States Patent and Trademark Office*